US008385328B2

(12) United States Patent
Seol et al.

(10) Patent No.: US 8,385,328 B2
(45) Date of Patent: Feb. 26, 2013

(54) APPARATUS AND METHOD FOR PROVIDING MIRRORING SERVICE IN VOLP SYSTEM INCLUDING IP-PBX (75) Inventors: See-Gyoung Seol, Seoul (KR); Yo-Sun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 12/456,459

(22) Filed: Jun. 17, 2009

(65) Prior Publication Data
US 2009/0310599 A1     Dec. 17, 2009

(30) Foreign Application Priority Data

Jun. 17, 2008   (KR) .................... 10-2008-0056881

(51) Int. Cl.
H04L 12/66   (2006.01)
(52) U.S. Cl. ........................................... 370/352
(58) Field of Classification Search .......... None
See application file for complete search history.

(56) References Cited

U.S. PATENT DOCUMENTS

| 7,933,263 | B1* | 4/2011 | Huang ............................ 370/356 |
| 2006/0203807 | A1* | 9/2006 | Kouretas et al. .............. 370/352 |
| 2007/0230361 | A1* | 10/2007 | Choudhury .................... 370/250 |

OTHER PUBLICATIONS

Schulzrinne et al., RFC 3550, Jul. 2003.*
Schulzrinne, et al.: RFC 3550, Jul. 2003, pp. 1-104.

* cited by examiner

Primary Examiner — Yong Zhou (57) ABSTRACT

An apparatus and method for automatically mirroring Real Time Protocol (RTP) packets in a Voice over Internet Protocol (VoIP) system including an Internet Protocol-Private Branch Exchange (IP-PBX). It is possible automatically detects call startup and/or termination from an RTP packet or an RTP Control Protocol (RTCP) packet provided through a mirroring port of the IP-PBX, and based on the detection of call startup and/or termination, automatically mirrors the RTP/RTCP packet, which is transmitted/received due to call establishment.

20 Claims, 5 Drawing Sheets

APPARATUS AND METHOD FOR PROVIDING MIRRORING SERVICE IN VOLP SYSTEM INCLUDING IP-PBX

CROSS-REFERENCE TO RELATED APPLICATION(S) AND CLAIM OF PRIORITY

The present application claims priority under 35 U.S.C. §119 (a) to an application entitled "APPARATUS AND METHOD FOR PROVIDING MIRRORING SERVICE IN VoIP SYSTEM INCLUDING IP-PBX" filed in the Korean Intellectual Property Office on Jun. 17, 2008, and assigned Serial No. 10-2008-0056881, the contents of which are incorporated herein by reference.

TECHNICAL FIELD OF THE INVENTION

The present invention relates to an apparatus and method for automatically mirroring RTP packets in a VoIP system including an IP-PBX.

BACKGROUND OF THE INVENTION

Figure 1:
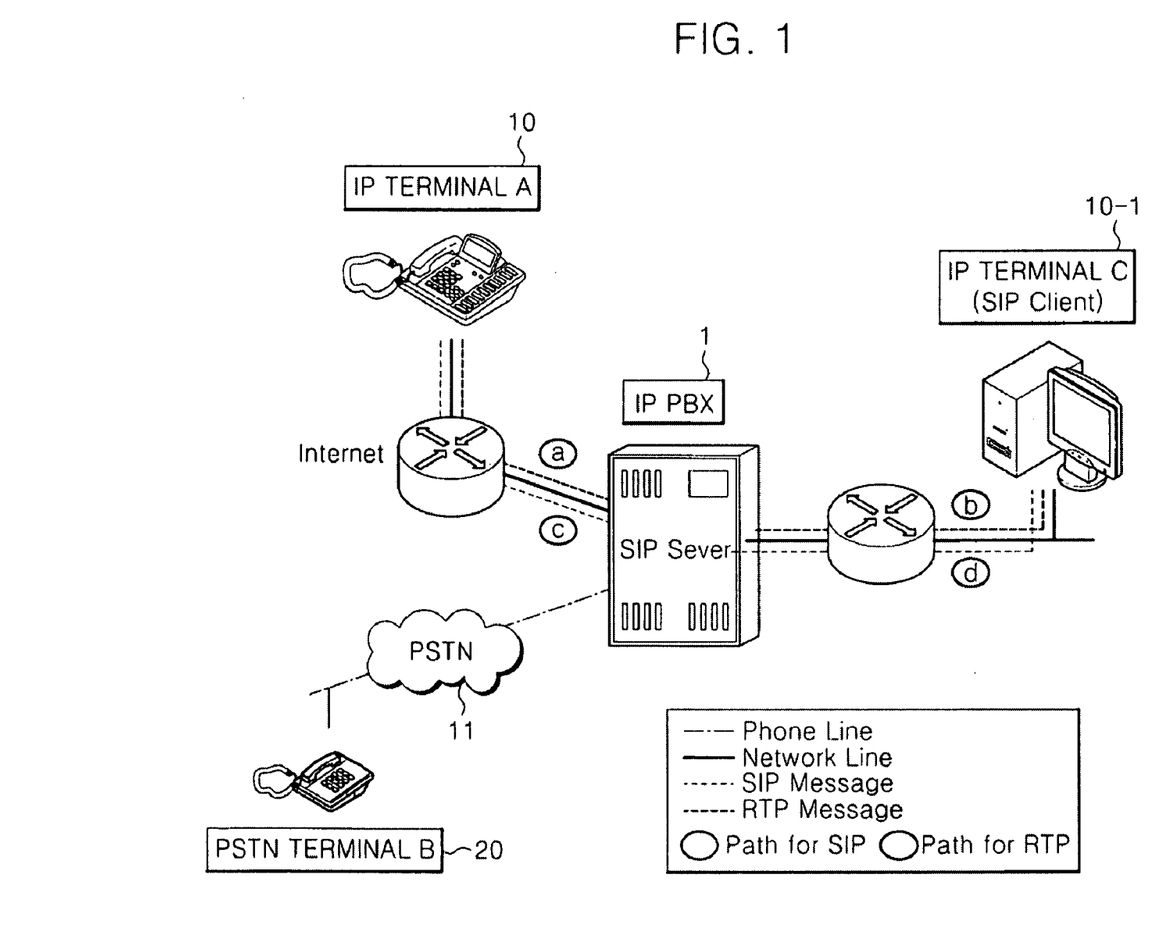
FIG. 1 illustrates a functional block diagram of the construction of a VoIP system including a conventional IP-PBX.

A Voice-over Internet Protocol (VoIP) system is established on the basis of both a Public Switched Telephone Network (PSTN) 11 and an Internet Protocol-Private Branch Exchange (IP-PBX) 1 that routes voice calls over the Internet.

A call entering the IP-PBX 1 from an Internet Protocol (IP) terminal 10 or a PSTN terminal 20 is connected to a destination IP terminal 10-1 through the following routes.

A separate signaling protocol or Session Initiation Protocol (SIP) is used in order to identify whether or not a call session of the IP terminal 10 is initiated/terminated.

When a SIP message as a call request message from the IP terminal 10 arrives at the IP-PBX 1, it is transferred to a SIP server program of the IP-PBX 1.

The SIP message is then transferred to the SIP client program, and the destination IP terminal 10-1 sends a SIP response message, such that a call is connected between the IP terminal 10 and the destination IP terminal 10-1.

Then, the IP terminal 10 and the destination IP terminal 10-1 exchange voices in the form of Real Time Protocol (RTP) packets through routes ⓒ and ⓓ.

Afterwards, when the call is terminated, a SIP message is exchanged and then the routes ⓐ and ⓒ are disconnected.

In call processing between the PSTN terminal 20 and the destination IP terminal 10-1, an off-hook message from the PSTN terminal 20 arrives at the IP-PBX 1 and is then transferred to the SIP server program of the IP-PBX 1.

In subsequence, the SIP message is transferred to the SIP client program, and the destination IP terminal 10-1 sends a SIP response message, so that a call is connected through routes ⓑ and ⓒ.

When the call is connected between the PSTN terminal 20 and the destination IP terminal 10-1 as above, voices from the PSTN terminal 20 are converted into data through a media Gateway Module (G/M) of the IP-PBX 1. The data is exchanged in the form of an RTP packet through the route ⓓ, between the G/M of the IP-PBX 1 and the destination IP terminal 10-1.

Afterwards, when the call is terminated, a SIP message is exchanged and the call connection through the routes ⓒ and ⓓ is terminated.

A typical method of mirroring an RTP packet in the VoIP system including the IP-PBX of the related art includes preparing a mirroring apparatus for mirroring the RTP packet to a mirroring port of the IP-PBX 1, detecting, at the IP-PBX 1, whether or not a call has started up or terminated based on a SIP signal, transmitting a control signal based on the detection to the mirroring apparatus, and starting up or terminating, at the RTP packet, a mirroring procedure in response to the control signal.

However, when the IP-PBX does not have a function of providing the control signal, the mirroring apparatus is required to receive RTP packets transmitted/received through the IP-PBX 1 for all time periods, and store the RTP packets provided through the mirroring port over all time periods irrespective of session startup or termination.

SUMMARY OF THE INVENTION

To address the above-discussed deficiencies of the prior art, it is a primary object to provide an apparatus and method for automatically mirroring Real Time Protocol (RTP) packets in a Voice over Internet Protocol (VoIP) system including an Internet Protocol-Private Branch Exchange (IP-PBX), in particular, to one that automatically detects call startup and/or termination from an RTP packet or an RTP Control Protocol (RTCP) packet provided through a mirroring port of the IP-PBX, and based on the detection of call startup and/or termination, automatically mirrors the RTP/RTCP packet, which is transmitted/received due to call establishment.

According to one aspect of the present invention, the apparatus for providing a mirroring service in a VoIP system including an IP-PBX, which transmits/receives RTP packets, may include an RTP packet transmission startup detector detecting whether or not a new call session with a specific Internet Protocol (IP) terminal has started up by identifying a header of an RTP packet provided through a mirroring port of the IP-PBX; an RTP packet transmission termination detector detecting whether or not the call session with a specific IP terminal has terminated based on whether or not an RTCP packet received through the mirroring port of the IP-PBX has been transmitted for a predetermined time; and a mirroring processor storing the RTP packet provided through the mirroring port in a packet memory if the RTP packet transmission startup detector detects that the call session has started up, and stopping storing the RTP packet in the packet memory if the RTP packet transmission termination detector detects that the call session is terminated.

The RTP packet transmission startup detector may detect whether or not the new call session with a specific IP terminal has started up by identifying a Synchronization Source (SSRC) of the header of the RTP packet.

The RTP packet transmission termination detector may detect whether or not the call session with a specific IP terminal has terminated by applying an SSRC timing-out attribute, and more particularly, delete a member, that has not transmitted an RTP or RTCP packet in a tc-MTd time, from a session receiver list and determine that a call session of the deleted member has been terminated.

The RTP packet transmission termination detector may delete a member, that has not transmitted an RTP packet in a tc-2T time corresponding to a total of two RTCP intervals, from a sender list and determine that a call session of the deleted member has been terminated According to another aspect of the present invention, the method for providing a mirroring service in a VoIP system including an IP-PBX, that transmits/receives RTP packets, may include the steps of detecting whether or not a new call session with a specific IP terminal has started up by identifying a header of an RTP packet provided through a mirroring port of the IP-PBX; if call session startup is detected, storing the RTP packet provided through the mirroring port of the IP-PBX in a packet memory; detecting whether or not the call session with a specific IP terminal has terminated based on whether or not an RTP Control Protocol (RTCP) received through the mirroring port of the IP-PBX has been transmitted for a predetermined time; and stopping storing the RTP packet in the packet memory if call session termination is detected.

Whether or not a new call session with a specific IP terminal has started up may be detected by identifying a Synchronization Source (SSRC) of an RTP packet header.

Whether or not the call session with a specific IP terminal has terminated may be detected by applying an SSRC timing-out attribute. In this case, the detecting whether or not the call session with a specific IP terminal has terminated may include steps of deleting any member, that has not transmitted an RTP or RTCP packet in a tc-MTd time, from a session receiver list and determining that a call session of the deleted member has been terminated.

The step of detecting whether or not the call session with a specific IP terminal has terminated comprises may include steps of deleting a member, that has not transmitted an RTP packet in a tc-2T time corresponding to a total of two RTCP intervals, from a sender list and determining that a call session of the deleted member has been terminated.

According to embodiments of the apparatus and method for automatically mirroring RTP packets in a VoIP system including an IP-PBX, it is possible to automatically detect call startup and/or termination from an RTP/RTCP packet provided through the mirroring port of the IP-PBX and automatically mirror the RTP/RTCP packet, which is transmitted/received without an additional control signal. In some embodiments, the apparatus and method are used in various types of VoIP applications such as a full recording system and a video conference recording system.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The present invention will now be described more fully hereinafter with reference to the accompanying drawings, in which exemplary embodiments of an apparatus and method for automatically mirroring RTP packets in a VoIP system including an IP-PBX of the invention are shown. It will be understood by those having an ordinary knowledge in the art that a system described below is merely exemplified for describing the invention with no limit to the scope of the present invention.

FIG. 1 is a functional block diagram illustrating the construction of a VoIP system including a typical IP-PBX. In the VoIP system including a typical IP-PBX, at least one IP terminal 10 connected through the Internet 12 to the IP-PBX 1 and at least one PSTN terminal 20 can be connected through the PSTN 11 to an IP-PBX 1.

Figure 2:
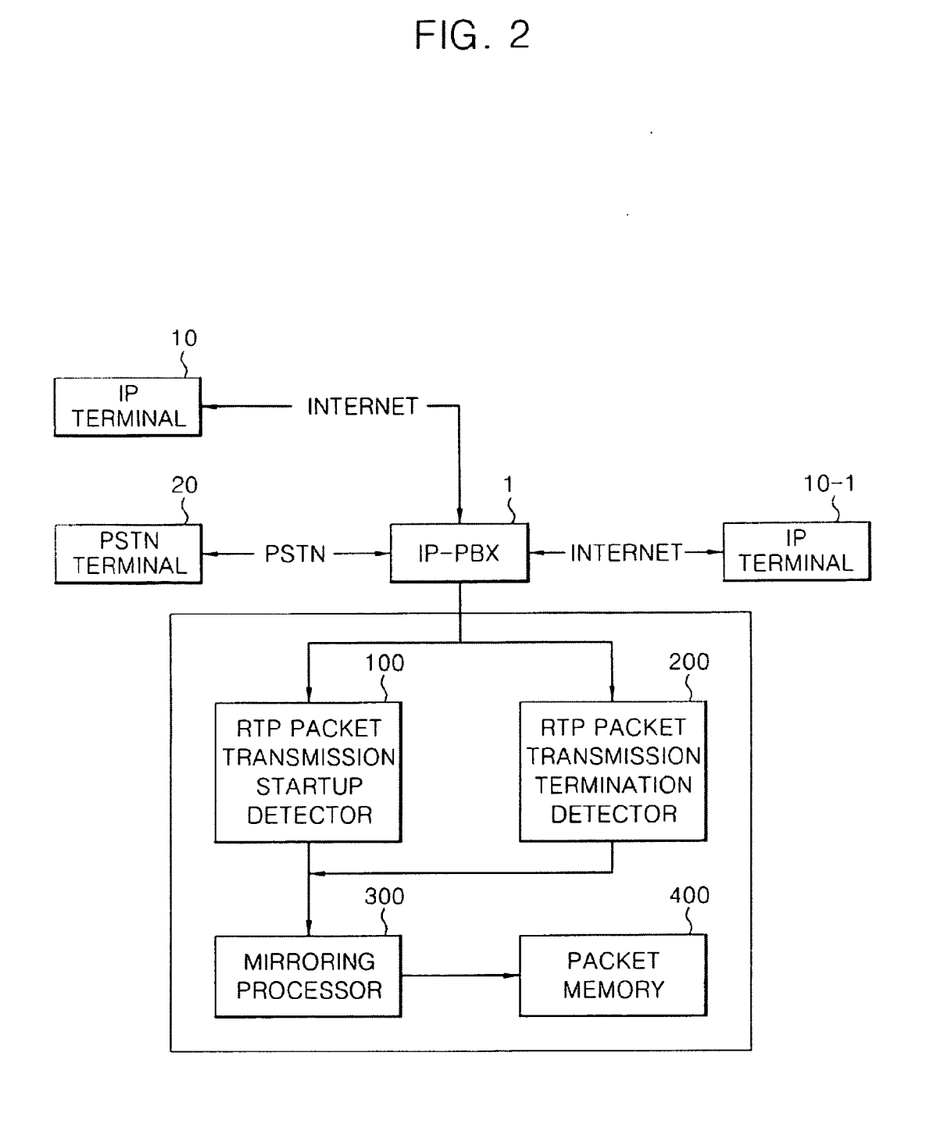
FIG. 2 illustrates a functional block diagram of the construction of an apparatus for providing a mirroring service in a VoIP system including an IP-PBX in accordance with one exemplary embodiment of the present invention.

FIG. 2 is a functional block diagram illustrating the construction of an apparatus for providing a mirroring service in a VoIP system including an IP-PBX in accordance with one exemplary embodiment of the present invention. In the VoIP system including an IP-PBX in accordance with the present invention, the apparatus for providing a mirroring service includes an RTP packet transmission startup detector 100, an RTP packet transmission termination detector 200, a mirroring processor 300, and a packet memory 400.

The packet transmission startup detector 100 detects whether or not a new call session with a specific IP terminal has started up by identifying a header of an RTP packet provided through a mirroring port of an IP-PBX 1. Specifically, the RTP packet transmission startup detector 100 detects whether or not the new call session of the specific IP terminal has started up by identifying an SSRC of the RTP packet header.

The RTP packet transmission termination detector 200 detects whether or not a call session has terminated based on whether or not an RTCP packet received via a mirroring port of the IP-PBX 1 has been transmitted for a predetermined time. The RTP packet transmission termination detector 200 detects whether or not the call session has terminated by applying an SSRC timing-out attribute. Specifically, the RTP packet transmission termination detector 200 deletes any member, which has not transmitted an RTP or RTCP packet in a tc-MTd time, from a session receiver list and determines that a call session of the deleted member has been terminated. In addition, the RTP packet transmission termination detector 200 deletes any member that has not transmitted an RTP packet in a tc-2T time (i.e., a total of two RTCP intervals) from a sender list and determines that a call session of the deleted member has been terminated.

In the tc-2T time, as specified in RFC 3550, tc is a present time, M is a timeout factor (with an initial value 5), Td is max (Tmin, n×C), Tmin is 2.5 seconds when a participant has not sent an RTCP packet or otherwise 5 seconds, n is a number of senders, C is an average RTCP packet size×4/RTCP bandwidth, and T is an RTCP transmission interval.

The mirroring processor 300 stores an RTP packet provided through the mirroring port in the packet memory 400 if the RTP packet transmission startup detector 100 detects that a call session has started up, and stops storing the RTP packet in the packet memory 400 if the RTP packet transmission termination detector 200 detects that the call session is terminated.

Operations essential to the present invention will now be described hereinafter, and detailed descriptions of well-known functions and operations will be omitted for clarity and conciseness.

The VoIP system including the IP-PBX 1 is configured as shown in FIG. 1. The apparatus for providing a mirroring service in the VoIP system including the IP-PBX 1 transmitting/receiving an RTP packet is connected to the mirroring port of the IP-PBX 1.

Then, the RTP packet transmission startup detector 100 detects that a new call session with a specific IP terminal has started up by identifying a header of an RTP packet provided through the mirroring port of the IP-PBX 1. For example, the RTP packet transmission startup detector 100 detects whether or not the new call session of the specific IP terminal has started up by identifying an SSRC of the RTP packet header.

In step S1 of detecting whether or not a new call session of an RTP packet has started up, originating and destination SSRC values are initialized to be −1.

Then, it is determined whether or not a received packet is a first packet.

If the received packet is the first packet, the SSRC of the packet is allocated to the originating or destination SSRC. The packet SSRC is assigned to the originating SSRC if the originating IP of the packet is the same as an IP terminal, and is assigned to the destination SSRC if the originating IP of the packet is the same as the destination IP address.

In the case where the received packet is not the first packet, if the SSRC is not the same as the originating or destination SSRC, and if the originating or destination SSRC is −1, it is determined to be a first call session of a voice-storing thread, and the packet is stored in the existing file. In the case where the received packet is not the first packet, if the SSRC is the same as the originating or destination SSRC, it is determined to be an existing session and the packet is stored in the present file.

Then, the mirroring processor 300 stores an RTP packet provided through the mirroring port.

Afterwards, the RTP packet transmission termination detector 200 detects whether or not a call session has terminated based on whether or not an RTCP packet received through the mirroring port of the IP-PBX 1 has been transmitted for a predetermined time. The RTP packet transmission termination detector 200 detects whether or not the call session has terminated by applying an SSRC timing-out attribute. Specifically, the RTP packet transmission termination detector 200 deletes any member, which has not transmitted an RTP or RTCP packet in a tc-MTd time, from a session receiver list and determines that a call session of the deleted member has been terminated. In addition, the RTP packet transmission termination detector 200 deletes any member that has not transmitted an RTP packet in a tc-2T time from a sender list and determines that a call session of the deleted member has been terminated.

If call session termination is detected through the RTP packet transmission termination detector 200, the mirroring processor 300 stops storing the RTP packet in the packet memory 400.

Figure 3:
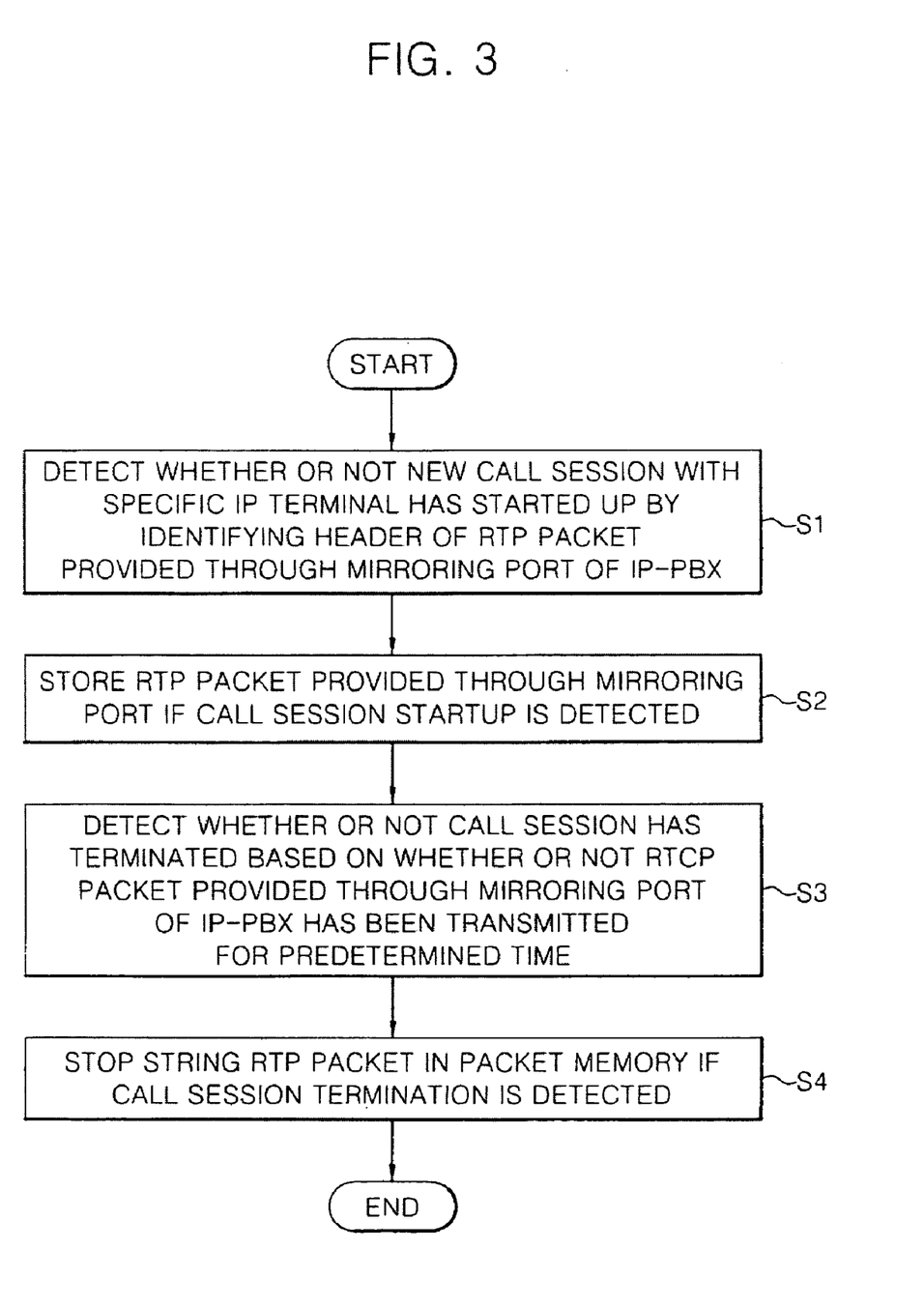
FIG. 3 illustrates a flowchart of a method for providing a mirroring service in a VoIP system including an IP-PBX in accordance with another exemplary embodiment of the present invention.

Below, with reference to FIG. 3, a description will be given of a method for providing a mirroring service in the VoIP system including an IP-PBX having the above-described configuration in accordance with the present invention.

A step of detecting whether or not a new call session with a specific IP terminal has started up is performed by identifying a header of an RTP packet provided through the mirroring port of the IP-PBX 1 (S1). In the step (S1) of detecting whether or not a new call session has started up, it is detected whether or not a new call session with a specific IP terminal has started up by identifying an SSRC of the RTP packet header.

Figure 4:
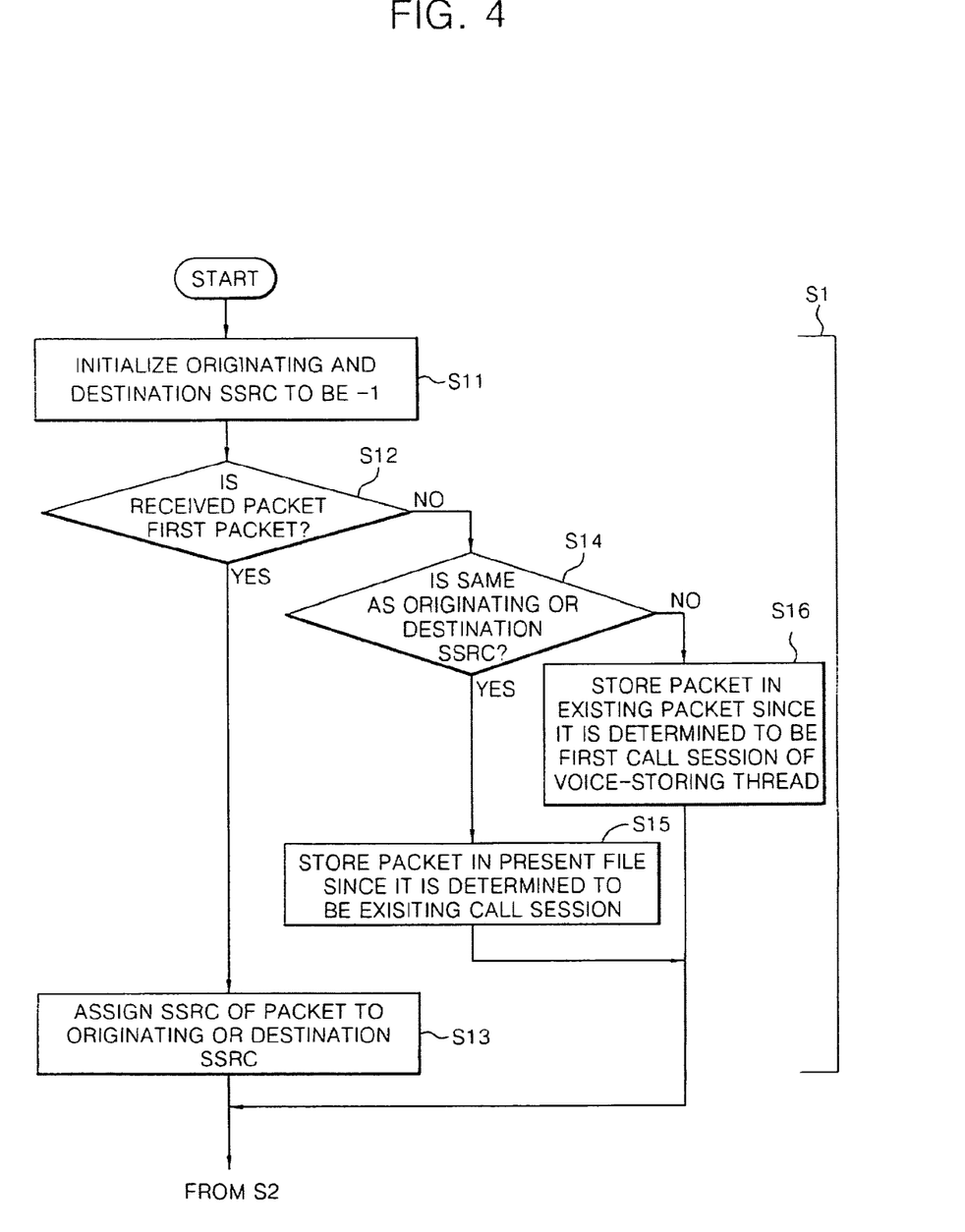
FIG. 4 illustrates a flowchart of sub-steps of the step of detecting whether or not a call session has started up in the method for providing a mirroring service in the VoIP system including an IP-PBX shown in FIG. 3.

Below, with reference to FIG. 4, a description will be given of the step (S1) of detecting whether or not a new call session has started up.

Originating and destination SSRC values are initialized to be −1 (S11).

Then, it is determined whether or not a received packet is a first packet (S12).

If the received packet is the first packet (YES), an SSRC of the packet is assigned to an originating or destination SSRC (S13). (The packet SSRC is assigned to the originating SSRC if the originating IP of the packet is the same as an IP terminal, and is assigned to the destination SSRC if the originating IP of the packet is the same as the destination IP address.)

In contrast, if the received packet is not the first packet (NO), it is determined whether or not the SSRC is the same as the originating or destination SSRC (S14).

In the step S14 of determining whether or not the SSRC is the same as the originating or destination SSRC, if the SSRC is not the same as the originating or destination SSRC (NO), and if the originating SSRC or the destination SSRC is −1, it is determined to be a first call session of a voice-storing thread, and the packet is stored in the existing file (S15).

In contrast, if the received packet is not the first packet, and if the SSRC is the same as the originating or destination SSRC (YES), it is determined to be an existing session and the packet is stored in the present file.

If call session startup is detected, the RTP packet provided through the mirroring port is stored (S2).

Then, it is detected whether or not the call session has terminated based on whether or not the RTCP packet received through the mirroring port of the IP-PBX 1 has been transmitted for a predetermined time (S3). The step S3 detects whether or not the call session has terminated by applying by applying an SSRC timing-out attribute. Specifically, the step S3 deletes any member that has not transmitted an RTP or RTCP packet in a tc-MTd time from a session receiver list and determines that a call session of the deleted member has been terminated.

Figure 5:
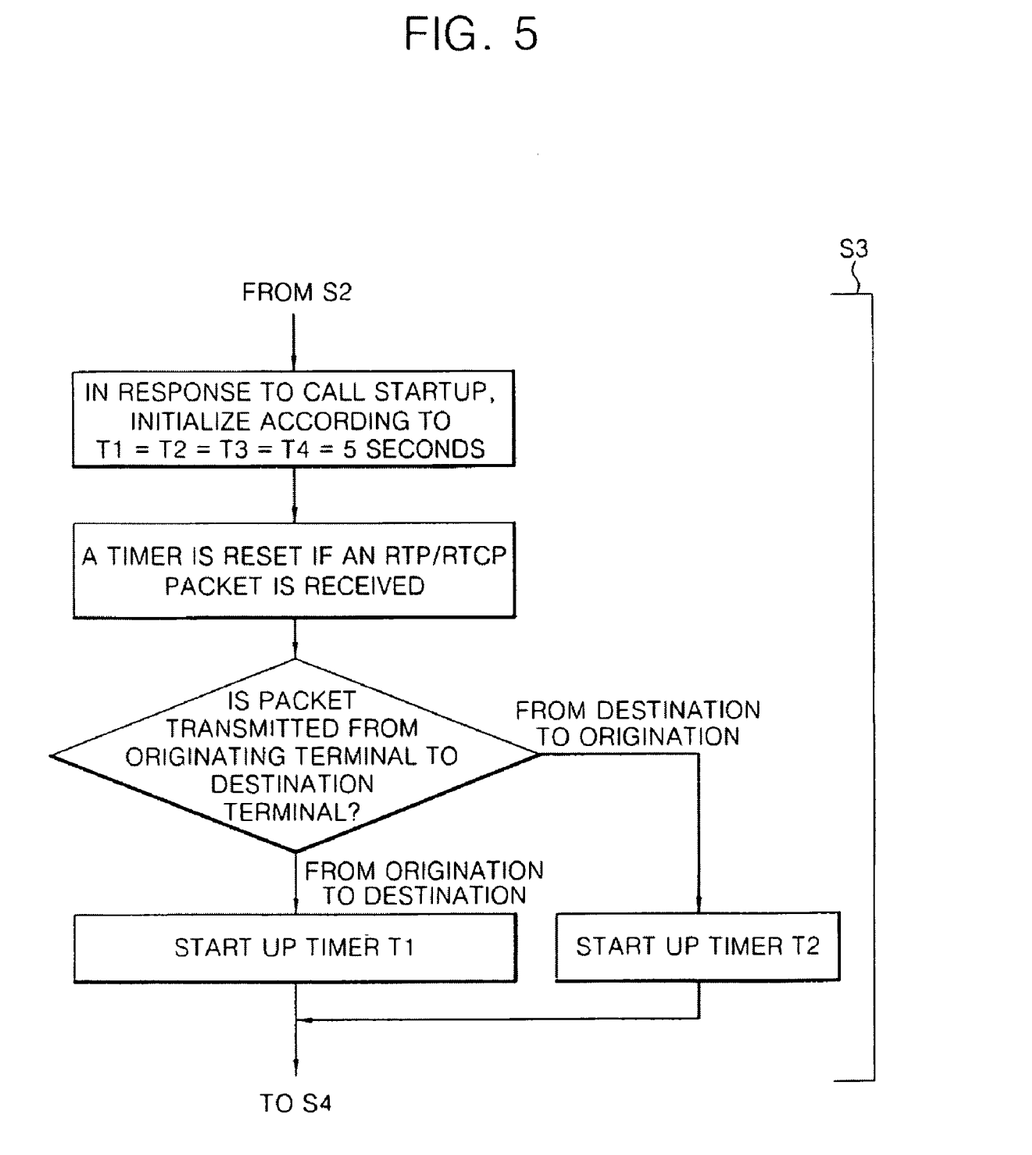
FIG. 5 illustrates a flowchart of sub-steps of the step of detecting whether or not a call session has terminated in the method for providing a mirroring service in the VoIP system including an IP-PBX shown in FIG. 3.

Below, with reference to FIG. 5, a description will be given of sub-steps of the step S3 of detecting whether or not the call session has terminated.

In response to call startup, initialization is performed according to the expression: T1=T2=T3=T4=5 seconds (S31).

Then, a timer is reset if an RTP/RTCP packet is received (S32).

If is determined whether or not the RTCP packet is transmitted from an originating terminal to a destination terminal (S33).

If the RTCP packet is transmitted from an originating (sending) terminal to the destination (receiving) terminal, a timer T1 is started up (S34). Here, timeout is 5 seconds, t1 is set to be t2, which is set as a time stamp T of the packet.

In contrast, if the RTCP packet is transmitted from the destination (receiving) terminal to the originating (sending) terminal, a timer T2 is started up (S35). Here, timeout is 5 seconds, i3 is set to be t4, which is set as a time stamp T of the packet.

In addition, the step S3 of detecting whether or not the call session has terminated deletes any member that has not transmitted an RTP packet in a tc-2T time (i.e., a total of two RTCP intervals) from a sender list and determines that a call session of the deleted member has been terminated.

If the RTP packet is transmitted from the originating (sending) terminal to the destination (receiving) terminal, a timer T3 is started up. In this case, a timeout is 2*(t2−t1).

In contrast, if the RTCP packet is transmitted from the destination (receiving) terminal to the originating (sending) terminal, a timer T4 is started up. In this case, a timeout is 2*(t4−t3).

If T1 and T3 or T2 and T4 is terminated, it is determined that the call is terminated.

In this case, if T1 (or T3) is terminated in the call, it is determined whether or not T3 (or T1) has terminated also. If both T1 and T3 are terminated, it is determined that the call is terminated.

In addition, if T2 (or T4) is terminated in the call, it is determined whether or not T4 (or T2) has terminated also. If both T2 and T4 are terminated, it is determined that the call is terminated.

Afterwards, a procedure for storing the RTP packet in the packet memory 400 is stopped if call session termination is detected.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for providing a mirroring service in a Voice over Internet Protocol (VoIP) system including an Internet Protocol-Private Branch Exchange (IP-PBX), which transmits/receives Real Time Protocol (RTP) packets, the apparatus comprising:
    an RTP packet transmission startup detector configured to:
        detect a call session with a specific Internet Protocol (IP) terminal by identifying a header of an RTP packet provided through a mirroring port of the IP-PBX;
        determine a type of the call session by comparing an originating identifier in the RTP packet to an initialized value and a destination identifier in the RTP packet to the initialized value; and
        when the type of the call session comprises a first call session for a voice-storing thread, assign the type to be an existing call session type;
    an RTP packet transmission termination detector configured to detect whether or not the call session with a specific IP terminal has terminated based on whether or not an RTP Control Protocol (RTCP) packet received through the mirroring port of the IP-PBX has been transmitted for a predetermined time; and
    a mirroring processor configured to store the RTP packet provided through the mirroring port in a packet memory in response to the RTP packet transmission startup detector detecting the call session and to stop storing the RTP packet in the packet memory in response to the RTP packet transmission termination detector detecting that the call session is terminated.

2. The apparatus of claim 1, wherein the RTP packet transmission startup detector is configured to detect the call session with a specific IP terminal by identifying a Synchronization SouRCe (SSRC) of the header of the RTP packet.

3. The apparatus of claim 1, wherein the RTP packet transmission termination detector is configured to detect whether or not the call session with a specific IP terminal has terminated by applying an SSRC timing-out attribute.

4. The apparatus of claim 3, wherein the RTP packet transmission termination detector is further configured to delete a member that has not transmitted an RTP or RTCP packet in a tc-MTd time from a session receiver list and to determine that a call session of the deleted member has been terminated, wherein tc is a present time, M is a timeout factor, Td is max(Tmin, n*C), Tmin is 2.5 seconds when a participant has not sent an RTCP packet and 5 seconds when a participant has sent an RTCP packet, n is a number of senders, and C is an average RTCP packet size*4/RTCP bandwidth.

5. The apparatus of claim 3, wherein the RTP packet transmission termination detector is further configured to delete a member that has not transmitted an RTP packet in a tc-2T time from a sender list and to determine that a call session of the deleted member has been terminated, wherein tc is a present time and T is an RTCP transmission interval.

6. A method for providing a mirroring service in a Voice over Internet Protocol (VoIP) system including an Internet Protocol-Private Branch Exchange (IP-PBX), which transmits/receives Real Time Protocol (RTP) packets, the method comprising:
    detecting a call session with a specific Internet Protocol (IP) terminal by identifying a header of an RTP packet provided through a mirroring port of the IP-PBX;
    when the call session is detected, determining a type of the call session by comparing an originating identifier in the RTP packet to an initialized value and a destination identifier in the RTP packet to the initialized value,
    when the type of the call session comprises a first call session for a voice-storing thread, assigning the type to be an existing call session type;
    when the call session is detected, storing the RTP packet provided through the mirroring port of the IP-PBX in a packet memory;
    detecting whether or not the call session with a specific IP terminal has terminated based on whether or not an RTP Control Protocol (RTCP) packet received through the mirroring port of the IP-PBX has been transmitted for a predetermined time; and
    stopping storing the RTP packet in the packet memory in response to the call session termination being detected.

7. The method of claim 6, wherein the call session is detected by identifying a Synchronization Source (SSRC) of an RTP packet header.

8. The method of claim 6, wherein whether or not the call session with a specific IP terminal has terminated is detected by applying an SSRC timing-out attribute.

9. The method of claim 8, wherein detecting whether or not the call session with a specific IP terminal has terminated comprises deleting any member that has not transmitted an RTP or RTCP packet in a tc-MTd time from a session receiver list and determining that a call session of the deleted member has been terminated, wherein tc is a present time, M is a timeout factor, Td is max(Tmin, n*C), Tmin is 2.5 seconds when a participant has not sent an RTCP packet and 5 seconds when a participant has sent an RTCP packet, n is a number of senders, and C is an average RTCP packet size*4/RTCP bandwidth.

10. The method of claim 8, wherein detecting whether or not the call session with a specific IP terminal has terminated comprises deleting a member that has not transmitted an RTP packet in a tc-2T time from a sender list and determining that a call session of the deleted member has been terminated, wherein tc is a present time and T is an RTCP transmission interval.

11. A Voice over Internet Protocol (VoIP) system, the system comprising:
   an Internet Protocol-Private Branch Exchange (IP-PBX); and
   a mirroring apparatus comprising:
      an RTP packet transmission startup detector configured to:
         determine a type of a call session by comparing an originating identifier in an RTP packet to an initialized value and a destination identifier in the RTP packet to the initialized value; and
         when the type of the call session comprises a first call session for a voice-storing thread, assign the type to be an existing call session type;
      an RTP packet transmission termination detector; and
      a mirroring processor configured to store the RTP packet provided through the mirroring port in a packet memory based on information received from the RTP packet transmission startup detector and to stop storing the RTP packet in the packet memory based on information received from the RTP packet transmission termination detector.

12. The system of claim 11, wherein the RTP packet transmission startup detector is further configured to detect whether or not a call session with a specific Internet Protocol (IP) terminal has started up by identifying a header of an RTP packet provided through a mirroring port of the IP-PBX.

13. The system of claim 12, wherein the information received from the RTP packet transmission startup detector corresponds to when the RTP packet transmission startup detector detects that the call session has started up.

14. The system of claim 12, wherein the RTP packet transmission startup detector is configured to detect whether or not the new call session with a specific IP terminal has started up by identifying a Synchronization Source (SSRC) of the header of the RTP packet.

15. The system of claim 12, wherein the RTP packet transmission termination detector is configured to detect whether or not the call session with a specific IP terminal has terminated based on whether or not an RTP Control Protocol (RTCP) packet received through the mirroring port of the IP-PBX has been transmitted for a predetermined time.

16. The system of claim 11, wherein the information received from the RTP packet transmission termination detector corresponds to when the RTP packet transmission termination detector detects that the call session is terminated.

17. The system of claim 11, wherein the RTP packet transmission termination detector is configured to detect whether or not the call session with a specific IP terminal has terminated by applying an SSRC timing-out attribute.

18. The system of claim 17, wherein the RTP packet transmission termination detector is further configured to delete a member that has not transmitted an RTP or RTCP packet in a tc-MTd time from a session receiver list and to determine that a call session of the deleted member has been terminated, wherein tc is a present time, M is a timeout factor, Td is max(Tmin, n*C), Tmin is 2.5 seconds when a participant has not sent an RTCP packet and 5 seconds when a participant has sent an RTCP packet, n is a number of senders, and C is an average RTCP packet size*4/RTCP bandwidth.

19. The system of claim 17, wherein the RTP packet transmission termination detector is further configured to delete a member that has not transmitted an RTP packet in a tc-2T time from a sender list and to determine that a call session of the deleted member has been terminated, wherein tc is a present time and T is an RTCP transmission interval.

20. The system of claim 11, wherein the IP-PBX is configured to transmit and receive Real Time Protocol (RTP) packets.

* * * * *

UNITED STATES PATENT AND TRADEMARK OFFICE
CERTIFICATE OF CORRECTION

| | | |
|---|---|---|
| PATENT NO. | : 8,385,328 B2 | Page 1 of 1 |
| APPLICATION NO. | : 12/456459 | |
| DATED | : February 26, 2013 | |
| INVENTOR(S) | : Seol et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this
Twenty-fifth Day of November, 2014

Michelle K. Lee
*Deputy Director of the United States Patent and Trademark Office*